H. E. HYDE.
SAFETY MECHANISM FOR MINE SKIPS AND CAGES.
APPLICATION FILED MAY 18, 1908.

956,707.

Patented May 3, 1910.

Witnesses:
F. Ovendale
F. A. Ovendale

Inventor:
Henry Edward Hyde
by Chas. Ovendale
Attorney

UNITED STATES PATENT OFFICE.

HENRY EDWARD HYDE, OF JOHANNESBURG, TRANSVAAL.

SAFETY MECHANISM FOR MINE SKIPS AND CAGES.

956,707.  Specification of Letters Patent.  Patented May 3, 1910.

Application filed May 18, 1908. Serial No. 433,552.

*To all whom it may concern:*

Be it known that I, HENRY EDWARD HYDE, a subject of the King of Great Britain, and resident of Johannesburg, Transvaal, have invented certain new and useful Improvements in Safety Mechanism for Mine Skips and Cages, of which the following is a specification.

This invention relates to safety brake mechanism primarily designed for the cages and skips employed in mine shafts.

The invention is also applicable to other types of hoisting apparatus, such as lifts, hoists, elevators, et cetera, in which the car or vehicle traverses and is guided in the shaft or well by skids or runners.

The object of the invention is to provide mechanism of simple construction which will gradually come into operation on the breaking of the hoisting rope or other part of the suspension gear, to retard and ultimately bring the skip, cage or other vehicle to rest. Practically simultaneously with the breaking of the rope the apparatus comes into operation and causes brake members to immediately exert a braking action to prevent any appreciable acceleration or accession of velocity after the vehicle becomes unsuspended.

The invention will now be fully described by aid of the accompanying drawings in which—

Figures 1, 3:
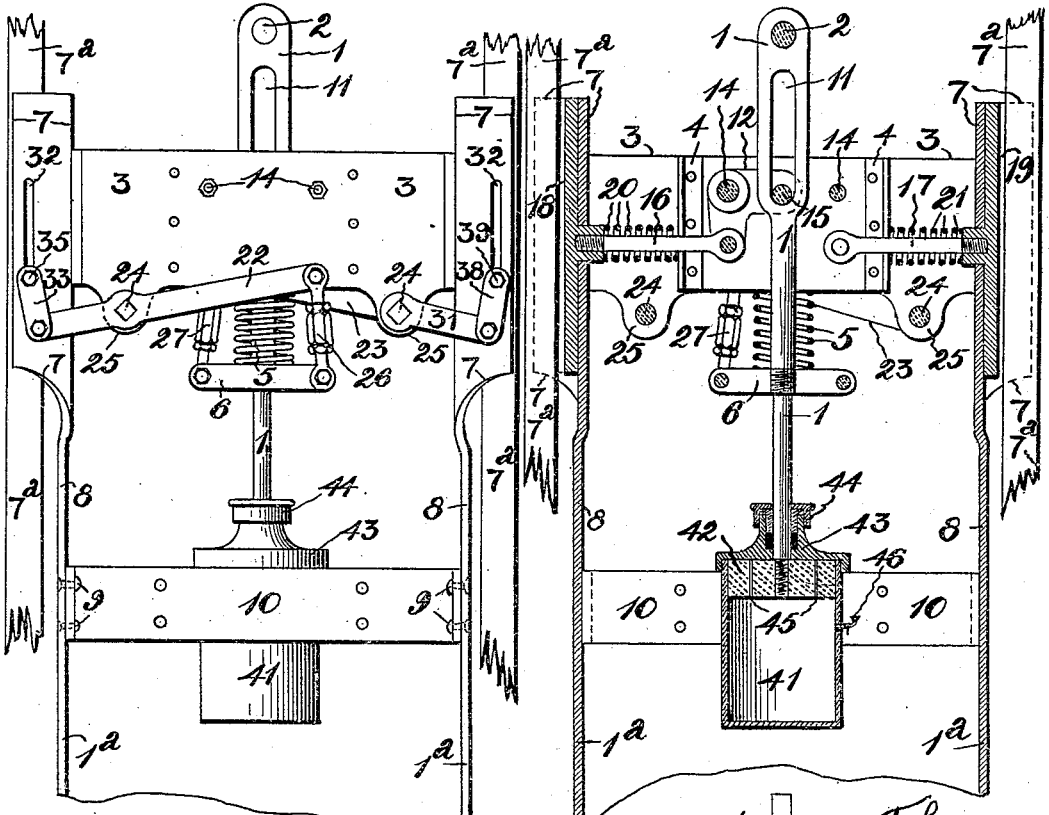
Figure 2:
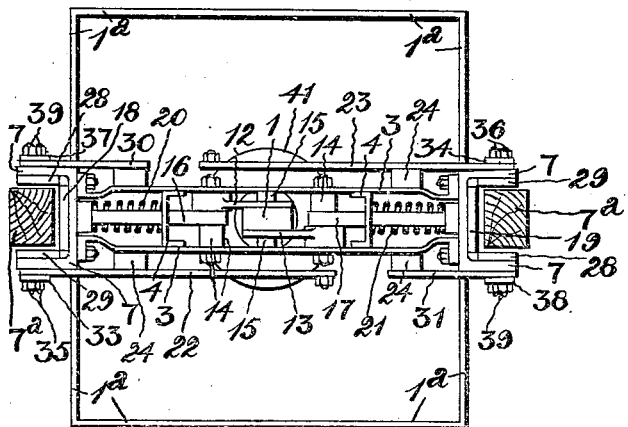
Figure 4:
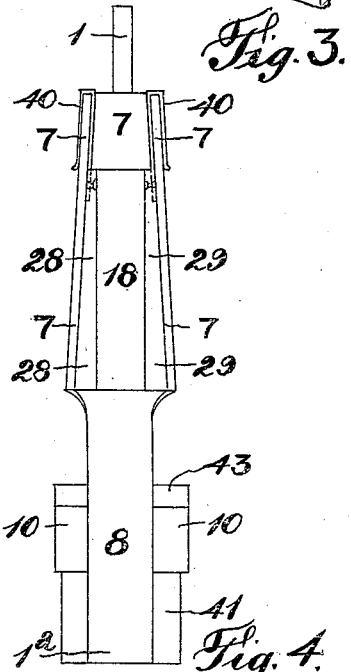

Figure 1 represents the safety brake mechanism and those parts of the suspension gear and guiding means in connection with which it operates in front elevation. Fig. 2 is a plan. Fig. 3 is a sectional elevation and Fig. 4 is an end elevation.

In the drawing I show part of the cage, skip or other vehicle represented by the side plates 1ª thereof. It is to be understood that the vehicle is connected with the hoisting rope through the medium of the draw bar 1 in the usual or in any convenient manner. The draw bar 1 may be conveniently arranged as at present in the upper or head portion of the frame of the vehicle. It is constructed as at 2 for attaching the shackle which makes the connection between the draw bar 1 and rope.

The frame for carrying the several operative parts of the brake mechanism comprises the two parallel head plates 3 which are bolted, riveted or otherwise securely connected through the medium of the two channel iron distance pieces 4, one located at each side of and at a suitable distance from the draw-bar 1. Encircling the draw-bar 1 beneath the head plates 3 is the usual king spring 5, in conjunction with which the draw-bar 1 works. The spring 5 is placed in compression in the normal running of the vehicle in the shaft, between a crosshead or member 6 screwed or otherwise suitably attached to the draw-bar 1, and the underside of the head plates 3. The weight of the vehicle is carried by the draw-bar 1 through the crosshead 6, king spring 5, and head plates 3.

To the ends of the head plates 3 are bolted, riveted or otherwise suitably attached channel iron members 7, which, as hereinafter explained, serve as housing and guides for the wedge shaped brake members. These channel iron guides 7 may as shown be formed in one piece with plates 8, shown riveted in their lower portions as at 9 in Fig. 1 to transverse horizontal members 10. The plates 8 may be extensions of the side plates 1ª of the cage or vehicle or of the ordinary shoes or be separate pieces riveted, bolted or otherwise suitably fixed to said side plates 1ª or shoes. The sides of the guides 7 converge or are inwardly inclined from the bottom to the top as seen in Fig. 4. In the running of the cage or vehicle said guides 7 traverse the ordinary skids or runners 7ª.

The draw-bar 1 in its upper portion is constructed with an elongated slot 11 and between the head plates 3 and at each side of the draw-bar 1 is located a bell crank lever 12, 13, 14 being bolts which constitute the pivot pins for said bell crank levers 12, 13.

15 is a pin which projects through the slot 11 in the draw-bar 1, and connects the two bell crank levers 12, 13. To the other arms of the bell crank levers 12, 13, are pivotally attached rods 16, 17, which work through holes in the distance pieces 4 and are attached at their outer ends (by being screwed into bosses formed thereon) to vertical flat plates 18, 19 constituting brake plates which operate on the front faces of the runners or skids. These flat plates 18, 19 are located inside the guides 7.

20, 21 are springs encircling the rods 16, 17 which serve for moving the flat brake plates 18, 19 into contact with the front faces of the runners 7ª immediately the rope breaks, as hereinafter described.

22, 23 are two horizontally or substantially horizontally disposed levers, one located at each side of the draw-bar 1 and carried by pins 24 revolubly supported in downwardly depending lugs 25 formed upon the head plates 3. The ends of the pins 24 are made square and fit correspondingly shaped holes in the levers 22, 23 to insure movement of the pins 24 with the levers. To the inner arm of each of the levers 22, 23 is pivotally connected one end of a rod 26, 27 which at its other end is pivotally connected to the crosshead or member 6 fixed to the draw-bar 1. These rods 26, 27 are, as shown, made adjustable so that their length can be increased or decreased to adjust the position of the parts as may be necessary. Each of the levers 22, 23 operates the two oppositely disposed wedges 28, 29 engaging the sides of the skids or runners 7ª. The wedges 28, 29 are shown in relative position in Figs. 2 and 4. In order to simultaneously actuate the two oppositely disposed wedges 28, 29 in each guide 7 from the two levers 22, 23, I provide for each lever another shorter lever 30, 31. These levers 30, 31 are non rotatably attached to the other extremities of the pins 24. The guides 7 at each side, are constructed with vertical slots 32 and the ends of the levers 22, 23 are attached by means of links 33, 34 and bolts or studs 35, 36 (which latter work in the slots 32) to the wedges 29, while the shorter levers 30, 31 are attached in like manner by links 37, 38 and bolts or studs 39 (working in their corresponding slots in the other sides of the guides 7) to the opposite wedges 28.

40 in Fig. 4 represent springs which are riveted at one end to the upper ends of the wedges 28, 29, and operate to keep the backs of the wedges 28, 29, tight against the correspondingly inclined sides of the guides 7 and prevent their coming into contact with the sides of the skids or runners in the normal running of the cage or vehicle.

In the frame I provide a cylinder 41 (it is shown carried by the transverse members 10 but if preferred it may be fixed to the top of the cage or vehicle in any other convenient manner) for holding oil or other suitable liquid. The draw-bar 1 has attached to its lower extremity a piston 42 which works in the cylinder 41.

43 is the cylinder cover and 44 a gland through which the lower end of the draw-bar 1 works.

Through the piston 42 are formed holes 45 placing the cylinder 41 in communication at opposite sides of the piston 42.

46 is a cup with tap for filling the cylinder 41. The inlet into the cylinder 41 from the cup 46 is placed about 2 inches (more or less) from the bottom of the piston 42 when the latter is in its uppermost position, as shown in Fig. 3. It will be apparent that the size of the holes 45 in the piston 42 will determine the distance the cage or vehicle will fall after the rope has broken.

The several parts of the mechanism may be inclosed and protected by a hood or bonnet suitably fixed to the head plates 3 or otherwise as preferred.

The operation of the mechanism is as follows:—In the several figures of the drawings the several parts are shown in their inoperative positions, the positions they take up when the weight of the cage or vehicle is being carried by the hoisting rope. In these positions the draw-bar 1 has been drawn up and placed the king spring 5 in compression between the cross head 6 and head plates 3. The upward movement of the draw-bar 1 has drawn the pin 15 (which is now at the bottom of the slot 11) in an upward direction, and drawn the flat brake plates 18, 19 against the inside of the guides 7. The piston 42 is now at the top of the cylinder 41 and some two inches (more or less) above the surface of the oil or fluid in the cylinder. The inner arms of the levers 22, 23, are raised by virtue of their connection with the crosshead 6 and the wedges 28, 29 are lowered in their guides 7 through the medium of said levers 22, 23, pins 24, levers 30, 31, and links 33, 37, 34, 38. In this position the flat brake plates 18, 19, and wedge shaped brake members 28, 29, run clear of the skids or runners 7ª. On the breakage of the rope or other part of the suspension gear, the draw-bar 1 is moved in a downward direction by the king spring 5 until the piston 42 comes into contact with the surface of the oil in the cylinder 41. This allows the springs 20, 21, to immediately move out the flat brake plates 18, 19, into contact with the front faces of the skids or runners 7ª, and so prevents any appreciable acceleration or accession of velocity of the unsuspended cage or vehicle. The king spring 5 exerting pressure on the piston 42 gradually displaces the oil from below to above the piston 42, the oil passing through the holes 45 in the latter. The gradual further downward movement of the draw-bar 1 lowers the inner arms of the levers 22, 23, through the rods 26, 27, and crosshead 6, and the other arms of the levers through the links 33, 34, raise the wedge shaped brake members 29 in their correspondingly shaped guides 7, while the other wedge shaped brake members 28 are simultaneously raised through the medium of the pins 24, levers 30, 31, and links 37, 38, and so move the vertical faces of said wedge shaped brake members 28, 29, into contact with the guides or runners 7ª with a gradually increasing brake pressure, which results in the ultimate stoppage of the falling vehicle.

What I claim as my invention and desire to protect by Letters Patent is:—

1. In a safety brake mechanism for the vehicles of hoisting apparatus, the combination with the vehicle and runners therefor of means for applying a gradually increasing brake pressure on the sides of the runners to retard the movement of the falling vehicle comprising, in combination, a draw bar, a king spring, a cross-head rigid with the draw bar, a pair of levers adjustably and pivotally connected at one end to the crosshead, a pair of shorter levers rigid with the first mentioned levers, upwardly and inwardly inclined guides fixed to the vehicle and traversing the runners, wedge shaped brake members in said guides at the sides of the runners, connections between the aforementioned levers and wedge shaped brake members, means for retarding the downward movement of the draw bar, independent brake members and means actuated by or through the medium of the draw bar for causing said independent brake members to come into contact with the front faces of the runners to check the falling vehicle immediately it becomes unsupported to prevent it gaining any appreciable acceleration of velocity.

2. In a safety brake mechanism for the vehicles of hoisting apparatus, the combination with the vehicle and runners therefor of means for applying a gradually increasing brake pressure on the sides of the runners to retard the movement of the falling vehicle comprising, in combination, a draw bar, a king spring, a crosshead rigid with the draw bar, a pair of levers adjustably and pivotally connected at one end to the crosshead, a pair of shorter levers rigid with the first mentioned levers, upwardly and inwardly inclined guides fixed to the vehicle and traversing the runners, wedge shaped brake members in said guides at the sides of the runners, connections between the aforementioned levers and wedge shaped brake members, means for retarding the downward movement of the draw bar, independent flat brake members in the aforesaid guides and parallel with the front faces of the runners, and means actuated by the draw bar for causing said independent flat brake members to have frictional contact with the front faces of the runners to check the falling vehicle immediately it becomes unsupported to prevent it acquiring any appreciable acceleration of velocity, said latter means comprising a pair of bell-crank levers operatively connected with the draw bar, rods connecting the bell-crank levers with the flat brake plates, and springs for operating said flat brake plates when the bell-cranks are released by the draw bar.

3. In a safety brake mechanism for the vehicles of hoisting apparatus, the combination with the vehicle and runners therefor of means for applying a gradually increasing brake pressure on the sides of the runners to retard the movement of the falling vehicle, comprising, in combination, a draw bar, a king spring, a crosshead rigid with the draw bar, a pair of levers adjustably and pivotally connected at one end to the crosshead, a pair of shorter levers rigid with the first mentioned levers, upwardly and inwardly inclined guides fixed to the vehicle and traversing the runners, wedge shaped brake members in said guides at the sides of the runners, connections between the aforementioned levers and wedge shaped brake members, means for retarding the downward movement of the draw bar comprising a fluid holding cylinder and a piston in said cylinder connected with the draw bar said piston having passages placing the opposite ends of the cylinder in communication, independent brake members and means actuated by or through the medium of the draw bar for causing said independent brake members to come into contact with the front faces of the runners to check the falling vehicle immediately it becomes unsupported to prevent it gaining any appreciable acceleration of velocity.

4. In a safety brake mechanism for the vehicles of hoisting apparatus, in combination a vehicle and runners therefor, a draw bar having an elongated slot, a crosshead fixed to the draw bar and a piston fixed to the draw bar, said piston having passages placing opposite sides of the piston in communication, a fluid holding cylinder, a cover therefor through which the draw bar projects, a gland in said cover around the draw bar, means for charging the cylinder, a frame comprising a pair of parallel head plates and distance pieces secured between them, a pair of bell-crank levers, pins supported by the head plates on which the bell-crank levers are fulcrumed, a pin connecting the arms of the bell-crank levers and engaging the slot in the draw bar, guides inwardly inclined from the bottom to the top fixed to the vehicle and adapted to traverse the runners, said guides having elongated vertical slots, flat brake members in said guides, rods pivotally connecting the bell-crank levers with the flat brake plates and springs which are placed in compression in the normal running of the vehicle and serve for moving said flat brake plates into contact with the runners on the downward movement of the draw bar, a pair of levers pivotally supported in the frame, adjustable rods connecting said latter levers with the crosshead, a pair of shorter levers rigid with the latter levers, wedge shaped brake members in the inclined guides at the sides of the runners, links connecting the levers with said wedge shaped brake members, the connection between said links and brake members being adapted to traverse the elongated vertical slots in the guides, and springs for retaining said wedge shaped brake members in their inoperative positions in the guides in the normal running of the vehicle.

In witness whereof I have hereunto set my hand in the presence of two subscribing witnesses.

HENRY EDWARD HYDE.

Witnesses:
 CHAS. OVENDALE,
 R. OVENDALE.